(12) United States Patent
Li

(10) Patent No.: US 12,265,734 B2
(45) Date of Patent: Apr. 1, 2025

(54) STORAGE NODES, INTEGRATED CIRCUITS AND METHODS FOR STORAGE NODE MANAGEMENT

(71) Applicant: ALIBABA GROUP HOLDING LIMITED, Grand Cayman (KY)

(72) Inventor: Shu Li, Sunnyvale, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/124,881

(22) Filed: Dec. 17, 2020

(65) Prior Publication Data
US 2022/0197551 A1 Jun. 23, 2022

(51) Int. Cl.
G06F 12/00 (2006.01)
G06F 3/06 (2006.01)

(52) U.S. Cl.
CPC .......... G06F 3/0659 (2013.01); G06F 3/0619 (2013.01); G06F 3/0629 (2013.01); G06F 3/0653 (2013.01); G06F 3/067 (2013.01); G06F 3/0683 (2013.01)

(58) Field of Classification Search
USPC ........................................................ 711/154
See application file for complete search history.

(56) References Cited

U.S. PATENT DOCUMENTS

| | | | | | |
|---|---|---|---|---|---|
| 6,128,642 | A | * | 10/2000 | Doraswamy | G06F 9/505 709/224 |
| 7,475,167 | B2 | * | 1/2009 | Wunderlich | H04L 67/1097 709/227 |
| 10,320,929 | B1 | * | 6/2019 | Johnson | H04L 67/1097 |
| 2006/0143509 | A1 | * | 6/2006 | Okawa | G06F 11/1052 714/E11.144 |
| 2007/0101097 | A1 | * | 5/2007 | Serizawa | G06F 3/0617 711/203 |
| 2014/0068621 | A1 | * | 3/2014 | Sitaraman | G06F 9/505 718/102 |
| 2014/0344533 | A1 | * | 11/2014 | Liu | G06F 3/067 711/154 |
| 2015/0193158 | A1 | * | 7/2015 | Yoon | G06F 11/108 711/105 |
| 2015/0304768 | A1 | * | 10/2015 | Prakash | G06F 1/3293 381/59 |
| 2015/0378899 | A1 | * | 12/2015 | Busaba | G06F 12/084 711/130 |
| 2016/0110118 | A1 | * | 4/2016 | Yang | G06F 3/0613 711/103 |
| 2020/0133531 | A1 | * | 4/2020 | Subramaniam | G06F 9/5027 |
| 2020/0133771 | A1 | * | 4/2020 | Goyal | H03M 13/1515 |
| 2020/0145509 | A1 | * | 5/2020 | Slik | H04L 67/63 |
| 2020/0371842 | A1 | * | 11/2020 | Tewari | G06F 9/445 |
| 2021/0232331 | A1 | * | 7/2021 | Kannan | G06N 20/00 |

* cited by examiner

*Primary Examiner* — Mohamed M Gebril
(74) *Attorney, Agent, or Firm* — Finnegan, Henderson, Farabow, Garrett & Dunner, LLP

(57) ABSTRACT

The present disclosure provides storage nodes, integrated circuits, and methods for storage node management. A method for storage node management includes performing one or more network tasks by one or more first processing cores in a network engine of an integrated circuit; and performing one or more storage tasks by one or more second processing cores in a storage engine of the integrated circuit.

19 Claims, 7 Drawing Sheets

STORAGE NODES, INTEGRATED CIRCUITS AND METHODS FOR STORAGE NODE MANAGEMENT

TECHNICAL FIELD

The present disclosure generally relates to data storage, and more particularly, to methods, devices, and non-transitory computer readable media for storage node management.

BACKGROUND

Modern-day data centers can have storage clusters that possess a huge amount of data for archival purpose, and the overall data amount increases rapidly. The archival data is rarely modified or deleted but can be read per request following a service level agreement (SLA). Various storage medium, such as memory cards, tapes, compact disks, hard disk drives, etc., can be used to store the archival data. Due to the increasing throughput and growing amount of the data stored in storage clusters, reducing the CPU utilization and power consumption required for managing storage nodes becomes a key requirement of the storage system.

SUMMARY OF THE DISCLOSURE

Embodiments of the present disclosure provide a storage node. The storage node includes a network interface, one or more storage components, and an integrated circuit communicatively coupled to the network interface and the one or more storage components. The integrated circuit includes a network engine including one or more first processing cores and a storage engine including one or more second processing cores. The one or more first processing cores are configured to perform one or more network tasks based on input data received by the network interface. The one or more second processing cores are configured to perform one or more storage tasks for storing data to the one or more storage components.

Embodiments of the present disclosure also provide an integrated circuit. The integrated circuit includes a network engine and a storage engine. The network engine includes one or more first processing cores configured to perform one or more network tasks. The storage engine includes one or more second processing cores configured to perform one or more storage tasks.

Embodiments of the present disclosure also provide a method for storage node management. The method includes: performing one or more network tasks by one or more first processing cores in a network engine of an integrated circuit; after performing the one or more network tasks, handing over one or more storage tasks to a storage engine of the integrated circuit via one or more job queues; and performing the one or more storage tasks by one or more second processing cores in the storage engine.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DETAILED DESCRIPTION

Figure 1:
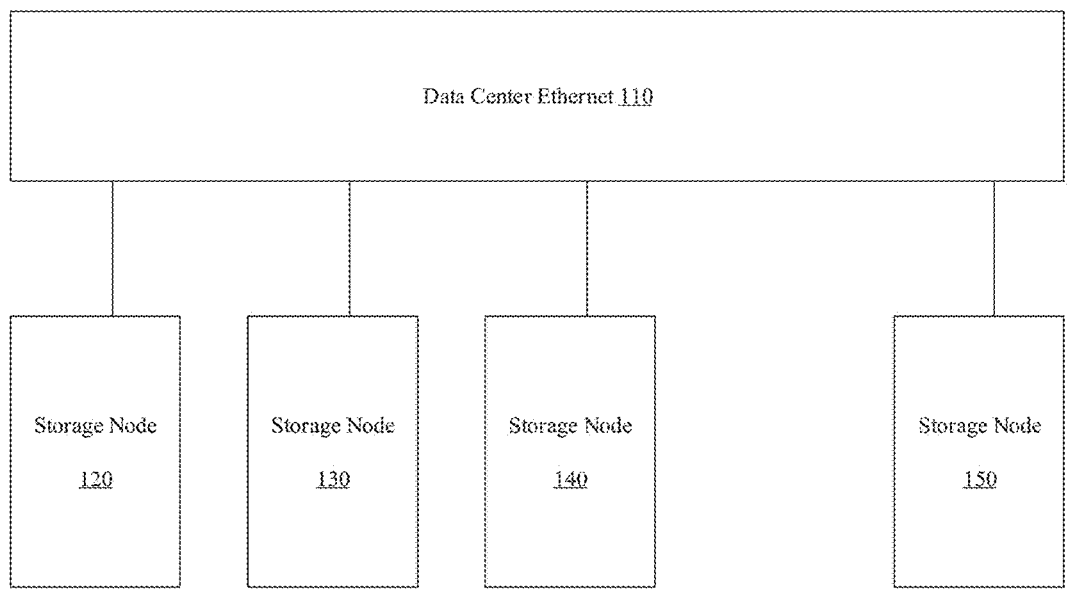
FIG. 1 is a diagram illustrating an example architecture of a storage system, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses, systems, and methods consistent with aspects related to the disclosure as recited in the appended claims. The terms and definitions provided herein control, if in conflict with terms or definitions incorporated by reference.

Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C. The term "exemplary" is used in the sense of "example" rather than "ideal."

In modern day data storage systems, the storage unit can be hard disk drives ("HDDs"). HDDs are electromechanical devices, which store data by manipulating the magnetic field of small portions of a rapidly rotating disk composed of ferromagnetic material. But HDDs have several limitations that make them less favored in modern day systems. In particular, the transfer speeds of HDDs are largely stagnated. The transfer speed of an HDD is largely determined by the speed of the rotating disk, which begins to face physical limitations above a certain number of rotations per second (e.g., the rotating disk experiences mechanical failure and fragments). Having largely reached the current limits of angular velocity sustainable by the rotating disk, HDD speeds have mostly plateaued. However, CPU's processing speed did not face a similar limitation. As the amount of data accessed continued to increase, HDD speeds increasingly became a bottleneck on system performance. This led to the search for and eventually introduction of a new memory storage technology.

To compensate for the shortcomings of HDDs, an alternative storage technology ultimate chosen was flash memory. Flash storage is composed of circuitry, principally logic gates composed of transistors. Since flash storage stores data via circuitry, flash storage is a solid-state storage technology, a category for storage technology that does not have (mechanically) moving components. A solid-state based device has advantages over electromechanical devices such as HDDs, because solid-state devices does not face the physical limitations or increased chances of failure typically imposed by using mechanical movements. Flash storage is faster, more reliable, and more resistant to physical shock. As its cost-per-gigabyte has fallen, flash storage has become increasingly prevalent, being the underlying technology of flash drives, SD cards, the non-volatile storage unit of smartphones and tablets, among others. And in the last decade, flash storage has become increasingly prominent in PCs and servers in the form of solid-state drives ("SSDs").

SSDs are, in common usage, secondary storage units based on flash technology. Technically referring to any secondary storage unit that does not involve mechanically moving components like HDDs, SSDs are made using flash technology. As such, SSDs do not face the mechanical limitations encountered by HDDs. SSDs have many of the same advantages over HDDs as flash storage such as having significantly higher speeds and much lower latencies. However, SSDs have several special characteristics that can lead to a degradation in system performance if not properly managed. In particular, SSD performs a process known as garbage collection before the SSD can overwrite any previously written data. The process of garbage collection can be resource intensive, degrading an SSD's performance. Moreover, the cost of SSDs is generally more expensive, and the maintenance cost for operating SSDs is more expensive as well. Therefore, for a database storage system, it is important to operate on both HDDs and SSDs to separate different types of data to store in either HDDs or SSDs.

In modern day data storage systems, data hotness is a general way to determine if data is updated or accessed frequently or not. In many systems, data that are accessed frequently can usually be stored in data storages that provide quicker access speed (e.g., SSDs), and data that are accessed or updated infrequently can be archived in data storages that are cheap to maintain and operate, but provide a slower access speed. As a result, there is a need to periodically migrate and archive at least a portion of the data into archive nodes. This archiving operation allows the data storage system to preserve more valuable data storages (e.g., SSDs) for hot data.

In existing storage node stack, a run to completion scheduling structure has been adopted, leading to each task running until it either finishes or yields control back to the scheduler. One run to completion system may have an event queue that is serviced either in strict order of admission by an event loop or by an admission scheduler which is capable of scheduling events out of order. One thread executes from receiving the remote procedure call (RPC) to the polling mode drive (PMD). With the storage node being developed in the scale-up trend and increased complexity of the internal bus, the corresponding CPU utilization (i.e., the amount of work handled by a CPU) and the power consumption also increase significantly.

In various embodiments of the present disclosure, simplified storage stack with the improved performance and power efficiency can be achieved by an integrated system-on-chip (SOC) controller performing pipelined scheduling and hardware-assisted acceleration, and by the removal of the legacy protocols.

With the assistance of logic circuits in each module in the controller, data-intensive processing tasks can be offloaded to lower the processor utilization and the required power consumption. By removing legacy protocols, the system can also benefit from the simplified firmware and driver and ensure the system reliability.

FIG. 1 is a diagram illustrating an example architecture of a storage system 100, consistent with some embodiments of the present disclosure. As shown in FIG. 1, in some embodiments, storage nodes 120, 130, 140, and 150 can be communicatively coupled via a data center ethernet 110. In some embodiments, storage system 100 can further include one or more archive nodes, which are also communicatively coupled via data center ethernet 110. When data migration is conducted from storage nodes 120, 130, 140, and 150 to archive nodes, a copy of the migration data can be placed in a buffer cluster. Later, data copies can be encoded with erasure coding ("EC") and stored into independent drives in an archive cluster. In some embodiments, an archive cluster may have many archive nodes, and each archive node can include one or more JBODs (acronym for "Just a Bunch of Disks"). It is noted that the number of storage nodes shown in FIG. 1 is merely an example and is not meant to limit the present disclosure. In some embodiments, one distributed storage cluster may include tens of storage nodes.

Figure 2:
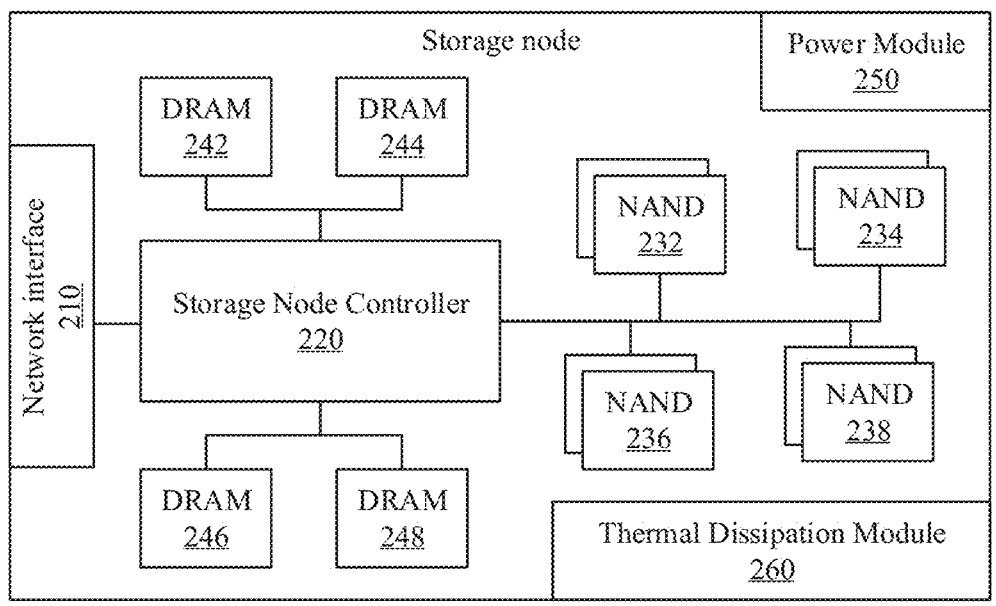
FIG. 2 illustrates an exemplary storage node, consistent with some embodiments of the disclosure.

FIG. 2 illustrates an exemplary storage node 200, consistent with some embodiments of the disclosure. In some embodiments, the same or similar architecture of storage node 200 may be used to implement storage nodes 120, 130, 140, or 150 shown in FIG. 1. According to FIG. 2, storage node 200 includes a network interface 210, a storage node controller (SNC) 220, one or more storage components (e.g., NAND flash memory cards 232, 234, 236 and 238), one or more memory devices 242, 244, 246 and 248, a power module 250 and a thermal dissipation system 260. In some embodiments, network interface 210 can be a peripheral component internet express ("PCIe"). In some embodiments, network interface 210 can provide a high throughput (e.g., 200 Gb).

In some embodiments, storage node controller 220 can be a hardware implementation, such as an integrated circuit ("IC"), which includes multiple processor cores assigned onto different processing stages of a pipelined scheduling process. Accordingly, each processor core handles the given tasks to fulfill network and storage functions with pipelined scheduling and with an enhanced efficiency and performance.

In some embodiments, storage components, including NAND flash memory cards 232, 234, 236 and 238, can be high-density NAND flash cards, such as quad-level cell ("QLC") NAND flash cards or other types of NAND cards. Storage node controller 220 can directly fan out the NAND interface via Toggle/Open NAND Flash Interface (ONFI) to communicate with NAND flash memory cards 232, 234, 236 and 238. High-density NAND flash cards have high capacity and enhanced throughput. In some embodiments, when data is written into the storage components, the storage components can keep sequential access of the data stored in the storage components. Therefore, writing operations on the storage components are different from the writing operations on the HDD, which are randomized.

Memory devices 242, 244, 246 and 248 may include random access memory (RAM), such as DRAM. Memory devices 242, 244, 246 and 248 can be communicatively coupled with storage node controller 220 via the internal bus or other communication mechanism for communicating information. In some embodiments, memory devices 242, 244, 246 and 248 may include a main memory, which can be used for storing temporary variables or other intermediate information during execution of instructions to be executed by processor cores in storage node controller 220. Such instructions, after being stored in non-transitory storage media accessible to storage node controller 220, render storage node 200 into a special-purpose machine that is customized to perform operations specified in the instructions.

Power module 250 is configured to supply power required by components of storage node 200. In some embodiments, power module 250 may include a battery unit and a power supply circuit to provide stable and reliable power to electrical components in storage node 200. For example, the power supply circuit may include power conversion circuits, filter circuits, over-voltage protection circuits, etc.

Thermal dissipation system 260 is configured to transfer and dissipate heat generated by the electrical components in storage node 200 to ensure that storage node 200 operates within a proper temperature range and keep storage node 200 from overheating. In some embodiments, thermal dissipation system 260 may adopt liquid cooling technology, such as an immersion cooling system. By immersing storage node 200 into non-conductive liquid, thermal energy generated by the components in storage node 200 can be transmitted into the surrounding fluid without additional active cooling systems or parts, such as heat sinks, heat pipes or fans. Accordingly, hot fluid evaporates and re-condenses to dissipate heat, which leads to an improved energy efficiency and reduced long-term costs.

Figure 3:
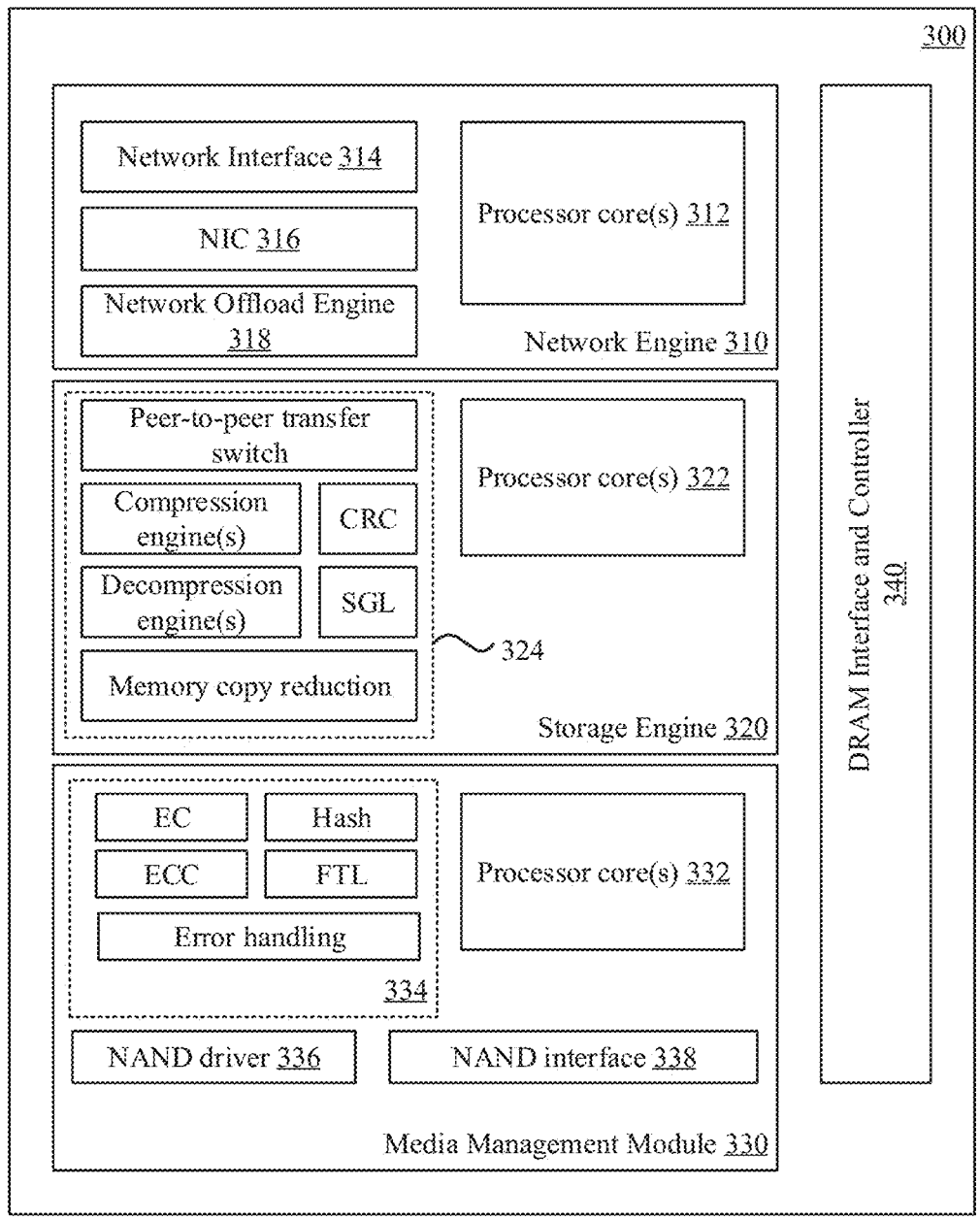
FIG. 3 illustrates an exemplary storage node controller, consistent with some embodiments of the disclosure.

FIG. 3 illustrates an exemplary SNC 300, consistent with some embodiments of the disclosure. In some embodiments, the same or similar architecture of SNC 300 may be used to implement storage node controller 220 shown in FIG. 2. As discussed above, multiple processor cores in SNC 300 are assigned onto different stages and perform different processing tasks in the pipelined scheduling process to improve the efficiency and performance. For example, SNC 300 includes a network engine 310, a storage engine 320, a media management module 330, and a DRAM interface and controller 340.

Network engine 310, storage engine 320, and media management module 330 are configured to handle tasks in different stages. Via DRAM interface and controller 340, network engine 310, storage engine 320, and media management module 330 have the DRAM access. Accordingly, processor cores and other hardware circuits in each engine or module can communicate with memory devices (e.g., memory devices 242, 244, 246 and 248) to obtain the data required to perform the assigned tasks.

As shown in FIG. 3, network engine 310 includes one or more processor cores 312, a network interface 314, a Network Interface Card (NIC) module 316, and a network offload engine 318. In some embodiments, network interface 314 may be a Quad Small Form-Factor Pluggable Double Density (QSFP-DD) interface, which expands on the QSFP pluggable form factor, a widely adopted four-lane electrical interface used across ethernet switches that enables interconnection between switches or to servers. Data received from network interface 314 can be processed by NIC module 316 to perform NIC functions. Then, job queues are passed to processor core(s) 312 to perform several network functions required by storage node 200.

In addition, network engine 310 may offload network protocol conversions or encryptions tasks from processing core(s) 312 to network offload engine 318. That is, network offload engine 318 can handle network protocol conversions or encryptions for the data before the data is transferred to storage engine 320. Accordingly, the workload of processing core(s) 312 can be reduced. After the network tasks are completed, processing core(s) 312 hand over the tasks by sending the job queues to storage engine 320. Accordingly, storage engine 320 can perform remaining storage tasks.

Storage engine 320 includes one or more processor cores 322 and one or more logic circuits 324 for hardware acceleration. Processor core(s) 322 can be used to perform several storage functions required by storage node 200. In addition, storage engine 320 may offload one or more specified functions from processing core(s) 322 to logic circuit(s) 324 to save the processor core utilization and improve the overall system performance by utilizing advantages of logic circuit(s) 324.

For example, storage engine 320 can apply a peer-to-peer transfer for the low-latency data movement among devices, and the memory copy can be implemented with the hardware circuit(s) to adjust the data format. In addition, logic circuit(s) 324 may be used to carry out several functions or features, such as a cyclic redundancy check (CRC) and a scatter gather list (SGL) for accelerating the data movement and reducing the memory copy.

In some embodiments, logic circuit(s) 324 may include a compression logic circuit or a decompression logic circuit. The compression logic circuit and the decompression logic circuit are respectively configured to carry out regular patterned operations for compression and decompression processing. Accordingly, the compression or decompression processing can be offloaded from processing core(s) 322 to the compression logic circuit or the decompression logic circuit to reduce the workload of processor core(s) 322 and reduce the required power consumption.

SNC 300 can complete the storage tasks required by storage node 200 by processing core(s) 322 and logic circuit(s) 324 proving hardware-assisted computation and organization features. Accordingly, in SNC 300, network engine 310 and storage engine 320 decouple the storage tasks with the network tasks and improve the overall quality of service (QoS) by avoiding the unevenly distributed resource during the real-time computations.

In some embodiments, media management module 330 includes one or more processor cores 332, one or more logic circuits 334 for hardware acceleration, one or more NAND drivers 336 and a parallel NAND interface 338. Processor core(s) 332 can be used to perform several media management functions required by storage node 200, including flash translation layer (FTL) process and error handling process.

Media management module 330 may implement the erasure coding (EC), the hash calculation/comparison, and error correction coding (ECC) with logic circuit(s) 334. For example, logic circuit(s) 334 may include EC circuitry providing EC encodings on the data. In some embodiments, the EC circuitry can be a hardware implementation or a hardware accelerator, such as a field programmable gate array ("FPGA") or an application-specific integrated circuit ("ASIC"). For example, an FPGA with an EC codec implementation can carry out the EC encoding required by an archival storage cluster. The EC encoding can provide redundant data pieces to be stored across different storage locations, so that data is better protected against accidental losses or access failures. After the EC encoding process, the data can be then transferred and stored into storage components via NAND driver 336 and NAND interface 338.

The encryption required by the storage component transportation can also be executed by processor core(s) 332 in media management module 330. In some embodiments, the archival meta-data format includes information for error correction code parity of the data in archival format. For example, the meta-data in the archival meta-data format may include multiple parts, with each part including information denoting to the location of the data in a corresponding archival cluster, such as drive index, part start, and part length. Some parts of the meta-data in the archival format can be denoted to the parity of error correction code.

In addition, logic circuit(s) 334 may also include hardware circuits configured to assist flash translation layer (FTL) process or error handling process. That is, flash translation layer (FTL) process or error handling process can be partially performed on processor core(s) 332 and partially on logic circuit(s) 334.

The one or more NAND drivers 336 can be communicatively coupled with one or more slots of the backplane NAND interface 338. Media cards (e.g., NAND flash memory cards 232, 234, 236 and 238 in FIG. 2) can be inserted into the one or more slots of the backplane NAND interface 338. Particularly, storage components may include a corresponding NAND interface which can be plugged into or removed from NAND interface 338.

Figure 4:
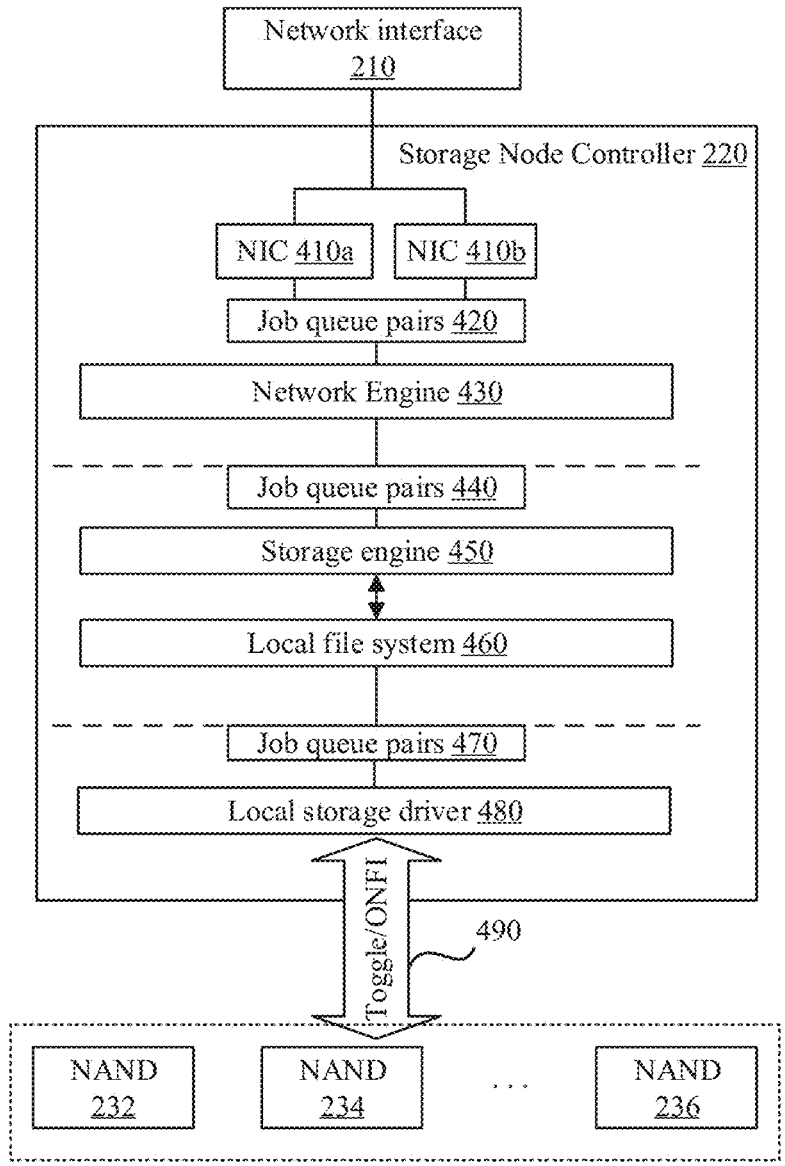
FIG. 4 illustrates a pipelined scheduling of a storage node stack, consistent with some embodiments of the disclosure.

FIG. 4 illustrates a pipelined scheduling of a storage node stack 400, consistent with some embodiments of the disclosure. In some embodiments, the same or similar pipelined scheduling illustrated in FIG. 4 can be achieved by storage node 200 shown in FIG. 2 or SNC 300 shown in FIG. 3. The dash-lines illustrated in FIG. 4 denote the position of the pipeline, in which the thread relays. By partitioning the tasks into segments and operating the tasks with dedicated mid-size processor cores (e.g., processor cores 312, 322, 332 in FIG. 3), the storage tasks and the network tasks can be decoupled.

In some embodiments, storage node stack 400 can carry out the implementation with a pipelined scheduling structure. As discussed above, storage node controller 220 includes a QSFP-DD interface to receive data from a network packet. After storage node controller 220 processes data by NICs 410a and 410b, network engine 430 performs network tasks being added to job queue pairs 420, and hand over remaining tasks into job queue pairs 440. Storage engine 450 then performs computation/storage tasks in job queue pairs 440 with the assistance of hardware circuits. For example, storage engine 450 may perform several computation and organization tasks, including reshuffling data into a storage-friendly format, calculating parity check (e.g., CRC), etc. After these tasks are completed, storage engine 450 communicates with a local file system 460, which assigns a bulk of continuous Logical Block Addresses (LBAs) to store the data, and hands over remaining tasks into job queue pairs 470.

A local storage driver 480 (e.g., NAND driver 336 in FIG. 3) may accordingly communicate with storage components (e.g., NAND flash memory cards 232, 234, 236 and 238) to exchange data via a Toggle/ONFI interface 490, which provides a reliable and straightforward media management. Accordingly, in some embodiments, storage node controller 220 can remove legacy protocols, such as NVMe protocol, to simplify the firmware/driver and guarantee a greater system reliability with the reduced data transfer complexity.

Figure 5:
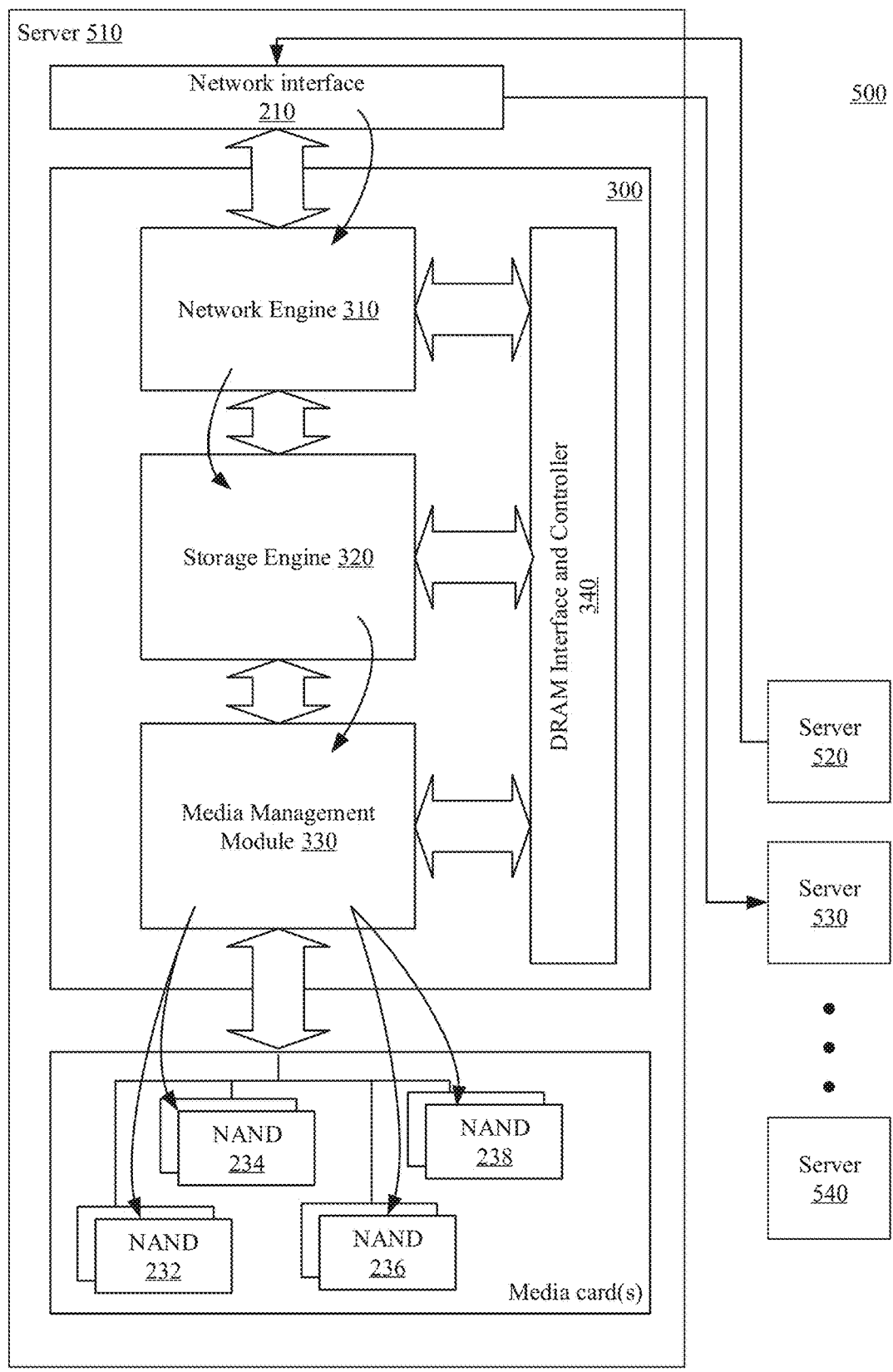
FIG. 5 illustrates an exemplary datacenter and an exemplary process for transferring data, consistent with some embodiments of the disclosure.

FIG. 5 illustrates an exemplary datacenter 500 and an exemplary process for transferring data, consistent with some embodiments of the disclosure. In some embodiments, datacenter 500 shown in FIG. 5 can be similar to storage system 100 of FIG. 1. Servers 510, 520, 530 and 540 of datacenter 500 shown in FIG. 5 can be similar to storage nodes 120-150 of storage system 100 shown in FIG. 1.

As shown in FIG. 5, when data is ready to be transferred from one storage node to another storage node, corresponding job queues for handling network-related tasks are assigned to network engine 310 to perform several operations, including protocol conversions or encryptions for the data. Then, network engine 310 can create corresponding job queues and assign storage-related tasks, such as operations related to memory copy reduction, peer-to-peer transfer, or data movement acceleration, to storage engine 320. After storage engine 320 completes these tasks, corresponding job queues are created and assigned to media management module 330, so that media management module 330 can handle the remaining tasks. For example, media management module 330 may include a meta-data converter configured to convert meta-data into archival meta-data format. In some embodiments, media management module 330 may include an encoding module configured to encode and partition the data. For example, the encoding module may perform the EC encoding process.

Accordingly, SNC 300 can store the encoded and partitioned data into multiple NAND regions (e.g., NANDs 232, 234, 236, and 238) in the media card. In some embodiments, each NAND region can correspond to one SMR HDD in archival cluster.

Figure 6A:
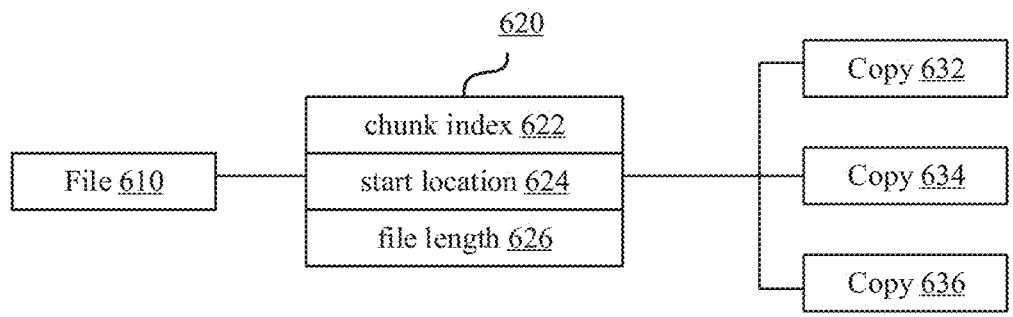
FIG. 6A and FIG. 6B illustrate an exemplary process of converting data formats, consistent with some embodiments of the disclosure.
Figure 6B:
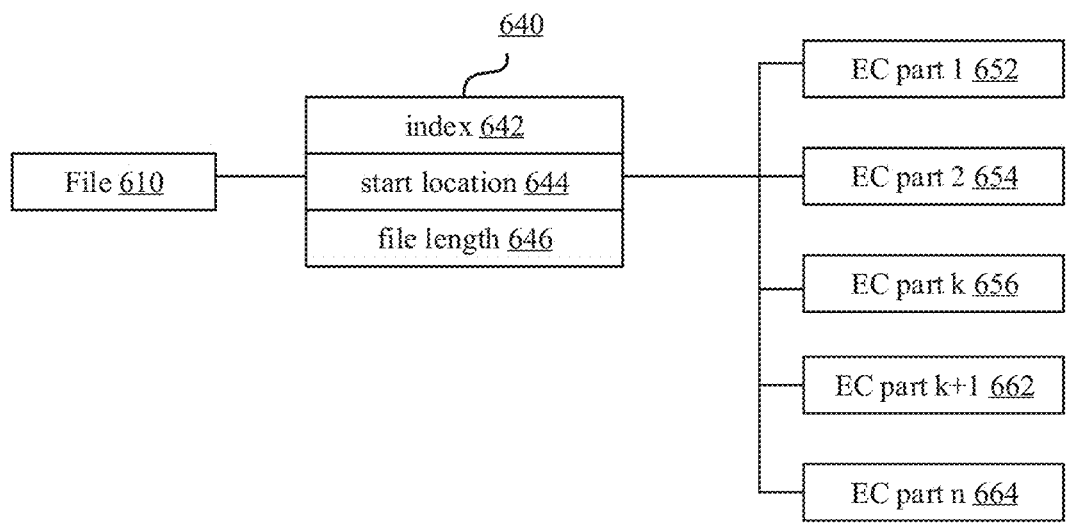

FIG. 6A and FIG. 6B illustrate an exemplary process of converting data formats, consistent with some embodiments of the disclosure. As shown in FIG. 6A and FIG. 6B, some storage systems may include two meta-data formats, namely regular meta-data format and archival meta-data format. FIG. 6A illustrates an exemplary regular meta-data format structure, consistent with some embodiments of the disclosure. FIG. 6B illustrates an exemplary archival meta-data format structure, consistent with some embodiments of the disclosure. In some embodiments, storage system 100 of FIG. 1 and datacenter 500 of FIG. 5 can use the regular meta-data format and the archival meta-data format.

As shown in FIG. 6A, with the existing data in a storage cluster and placement rules in an archival system, the storage system can derive data's location in the media cards (e.g., NANDs 232, 234, 236, and 238 of FIG. 5) and the SMR HDDs. Accordingly, placement can be planned ahead in another data center using fixed rules that are inherent in the storage cluster and the archival cluster. For example, as shown in FIG. 6A, meta-data 620 for a file 610 includes a data chunk index 622, a start location 624, and a file length 626 of file 610. Using data chunk index 622 and start location 624, the beginning of file 610 can be located in the storage cluster by finding the chunk with the chunk index and using the start location to count from the beginning of this chunk. Then, file 610 can be obtained from the storage cluster by reading the exact length of data according to the file length of file 610. In some embodiments, the actual data reading operation does not take place at this meta-data conversion stage. This conversion stage analyzes the meta-data of the storage cluster to generate the archival meta-data which can be stored in a meta-data drive. Then, based on the meta-data, the data from the storage cluster can be located and read out.

In some embodiments, the same data in the storage cluster may have multiple copies. For example, as shown in FIG. 6A, file 610 has three copies 632, 634 and 636. Since each copy may be stored in different drives or locations in the storage cluster, the meta-data for each copy can also include location information for the drives, such as drive indices. In some embodiments, for data having multiple copies, data can be transferred concurrently from different copies. For example, because file 610 has three copies, the first ⅓ of the data can be transferred from the first copy (e.g., copy 632), the second ⅓ of the data can be transferred from the second copy (e.g., copy 634), and the last ⅓ of the data can be transferred from the third copy (e.g., copy 634). Accordingly, if three copies can be transferred concurrently, the system may reduce the overall transfer time.

After the data is converted from the regular meta-data format to the archival meta-data format, the archival meta-data format can include one or more slices with EC encoding. In some embodiments, the archival meta-data format includes information for error correction code parity of the data in archival format. For example, as shown in FIG. 6B, meta-data 640 includes multiple parts (e.g., EC parts 652, 654, 656, 662 and 664), with each part having information denoting to the location of the data in a corresponding archival cluster, such as a drive index 642, a part start location 644, and a part length 646. Some slices of the meta data in the archival format (e.g., parts 662 and 664) can be denoted to EC parity bits, while other slices of the meta data in the archival format (e.g., parts 652, 654 and 656) can be denoted to EC user bits.

Particularly, the data chunk can be encoded using a selected erasure code to generate an EC codeword. In various embodiments, an erasure code includes a forward error correction (FEC) code and one that transforms an input message into a codeword of a longer length such that the original message can be recovered from a subset of the symbols of the codeword. Example erasure codes include Reed Solomon and the K+1 parity check. In some embodiments, an erasure code may be selected to use to encode a data chunk based on a computer program or a user configuration. According to the selected erasure code, EC processor 116 generates (n-k) parity slices with k user slices (e.g., input bits) from the data chunk, thereby creating the codeword with n slices. So, after EC encoding, the amount of data increases to n/k times of the incoming data. The original data chunk can be recovered from a subset of the erasure code group based on the erasure code decoding tolerance of the selected erasure code.

Figure 7:
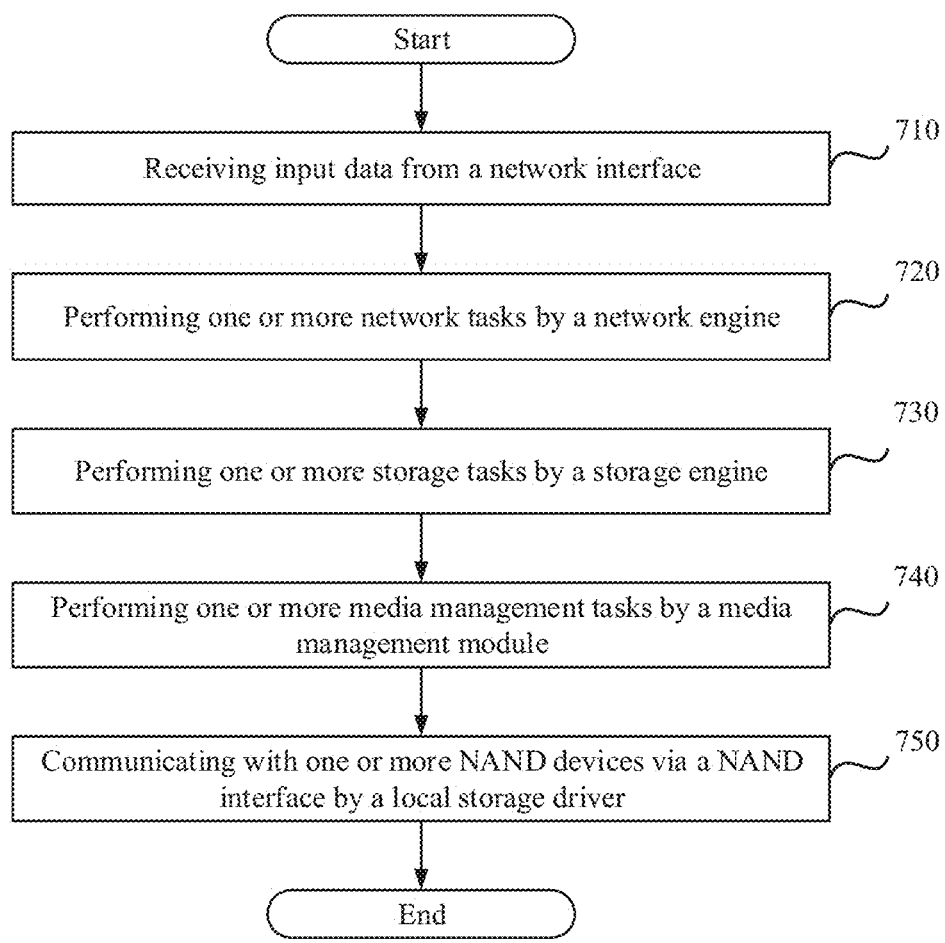
FIG. 7 illustrates an exemplary flow diagram for performing a method for storage node management, consistent with some embodiments of the present disclosure.

FIG. 7 illustrates an exemplary flow diagram for performing a method 700 for storage node management, consistent with some embodiments of the present disclosure. Method 700 can be performed in a storage node (e.g., storage node 200 in FIG. 2) by a storage node controller (e.g. storage node controller 220 in FIG. 2) according to some embodiments of the present disclosure. Method 700 in FIG. 7 illustrates operations for the pipelined scheduling process performed by the controller.

At step 710, the controller receives input data from a network interface (e.g., network interface 210 in FIG. 2 and network interface 314 in FIG. 3).

At step 720, the controller performs one or more network tasks by a network engine (e.g., network engine 310 in FIG. 3). Particularly, in some embodiments, the network engine performs one or more network tasks by one or more processing cores assigned to the network engine to handle the given network tasks. In some embodiments, at step 720, the network engine further offloads network protocol processing from the processing core(s) to a network protocol engine in the network engine.

At step 730, the controller performs one or more storage tasks by a storage engine (e.g., storage engine 320 in FIG. 3). Particularly, in some embodiments, the storage engine performs one or more storage tasks by one or more processing cores assigned to the storage engine to handle the given storage tasks. In some embodiments, at step 730, the storage engine further offloads several tasks to respective logic circuits to achieve the hardware acceleration. For example, at step 730, the storage engine may further offload compression processing from the processing core(s) assigned to the storage engine to a compression logic circuit in the storage engine and offload decompression processing from the processing core(s) assigned to the storage engine to a decompression logic circuit in the storage engine. In addition, the storage engine can apply the peer-to-peer transfer for the low-latency data movement among different devices and implement the memory copy directly using the hardware circuits to adjust the data format. In addition, logic circuits in the storage engine can be used to provide CRC and SGL features to accelerate the data movement and reduce the memory copy.

At step 740, the controller performs one or more media management tasks by a media management module (e.g., media management module 330 in FIG. 3). Particularly, in some embodiments, the media management module performs one or more media management tasks by one or more processing cores assigned to the media management module to handle the given tasks. Similarly, in some embodiments, at step 740, the media management module further implements several tasks, fully or partially, with the assistance of respective logic circuits in the media management module to reduce the workloads of the processing core(s). For example, at step 740, the media management module may offload an erasure coding, a hash calculation or comparison, an error correction coding, or any combination thereof, to one or more corresponding logic circuits in the media management module. The media management module may also perform FTL process or error handling partially on the processing core(s) assigned to the media management module and partially on one or more corresponding logic circuits in the media management module.

At step 750, the controller communicates with one or more storage components (e.g., NAND flash devices) via an interface (e.g., NAND interface 338 in FIG. 3) by a local storage driver (e.g., NAND driver 336 in FIG. 3). In some embodiments, the controller directly fans out the interface via Toggle/ONFI to communicate with NAND flash cards.

By performing method 700 described above, the controller integrates the functions of the central processing unit (CPU), the NIC, SSD controller, chipset, etc. In addition, the controller can offload, fully or partially, data-intensive processing, such as erasure coding and compression/decompression into corresponding logic circuits to lower the processor utilization and reduce the power consumption.

In view of above, as proposed in various embodiments of the present disclosure, the proposed devices and methods can simplify the storage stack system and improve the input/output processing efficiency and the quality of service with the pipelined scheduling and hardware accelerations. In some embodiments, the network engine, the storage engine, and the media management module each includes corresponding logic circuits for efficiency and performance enhancement.

Embodiments of the disclosure also provide a computer program product. The computer program product may include a non-transitory computer readable storage medium having computer readable program instructions thereon for causing a processor to carry out the above-described methods.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object-oriented programming language, and conventional procedural programming languages. The computer readable program instructions may execute entirely on a computer system as a stand-alone software package, or partly on a first computer and partly on a second computer remote from the first computer. In the latter scenario, the second, remote computer may be connected to the first computer through any type of network, including a local area network (LAN) or a wide area network (WAN).

The computer readable program instructions may be provided to a processor of a computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which includes one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable sub-combination or as suitable in any other described embodiment of the specification. Certain features described in the context of various embodiments are not to be considered essential features of those embodiments, unless the embodiment is inoperative without those elements.

The embodiments may further be described using the following clauses:

1. A storage node, comprising:
a network interface;
one or more storage components; and
an integrated circuit communicatively coupled to the network interface and the one or more storage components, the integrated circuit comprising:
a network engine comprising one or more first processing cores, the one or more first processing cores configured to perform one or more network tasks based on input data received by the network interface; and
a storage engine comprising one or more second processing cores, the one or more second processing cores configured to perform one or more storage tasks for storing data to the one or more storage components.

2. The storage node of clause 1, wherein the network engine further comprises a network protocol engine, and is configured to offload network protocol processing from the one or more first processing cores to the network protocol engine.

3. The storage node of clause 1 or clause 2, wherein the storage engine further comprises a compression logic circuit or a decompression logic circuit and is configured to offload compression or decompression processing from the one or more second processing cores to the compression logic circuit or the decompression logic circuit.

4. The storage node of any one of clauses 1-3, wherein the integrated circuit further comprises:
a media management module comprising one or more third processing cores configured to perform one or more media management tasks.

5. The storage node of clause 4, wherein the media management module further comprises one or more logic circuits and is configured to offload an erasure coding, a hash calculation or comparison, an error correction coding, or any combination thereof to the one or more logic circuits in the media management module.

6. The storage node of clause 4 or clause 5, wherein the media management module further comprises one or more logic circuits and is configured to perform flash translation layer process or error handling process partially on the one or more third processing cores and partially on the one or more logic circuits in the media management module.

7. The storage node of any one of clauses 1-6, wherein the one or more storage components comprise one or more NAND devices, and the integrated circuit comprises a local storage driver configured to communicate directly with the one or more NAND devices via a NAND interface.

8. The storage node of any one of clauses 1-7, wherein the network engine further comprises a second network interface configured to receive the input data.

9. An integrated circuit, comprising:
a network engine comprising one or more first processing cores, the one or more first processing cores configured to perform one or more network tasks; and
a storage engine comprising one or more second processing cores, the one or more second processing cores configured to perform one or more storage tasks.

10. The integrated circuit of clause 9, wherein the network engine comprises a network protocol engine and is configured to offload network protocol processing from the one or more first processing cores.

11. The integrated circuit of clause 9 or clause 10, wherein the storage engine comprises a compression logic circuit or a decompression logic circuit and is configured to offload compression or decompression processing from the one or more second processing cores to the compression logic circuit or the decompression logic circuit.

12. The integrated circuit of any one of clauses 9-11, further comprising:
a media management module comprising one or more third processing cores, the one or more third processing cores configured to perform one or more media management tasks.

13. The integrated circuit of clause 12, wherein the media management module comprises one or more logic circuits and is configured to offload an erasure coding, a hash calculation or comparison, an error correction coding, or any combination thereof to the one or more logic circuits.

14. The integrated circuit of clause 12 or clause 13, wherein the media management module comprises one or more logic circuits and is configured to perform flash translation layer process or error handling process partially on the one or more third processing cores and partially on the one or more logic circuits.

15. The integrated circuit of any one of clauses 9-14, further comprising:
a local storage driver configured to communicate directly with one or more NAND devices via a NAND interface.

16. The integrated circuit of any one of clauses 9-15, wherein the network engine further comprises a network interface configured to receive input data for the one or more first processing cores to perform the one or more network tasks.

17. A method for storage node management, comprising:
performing one or more network tasks by one or more first processing cores in a network engine of an integrated circuit;
after performing the one or more network tasks, handing over one or more storage tasks to a storage engine of the integrated circuit via one or more job queues; and
performing the one or more storage tasks by one or more second processing cores in the storage engine.

18. The method of clause 17, further comprising:
offloading network protocol processing from the one or more first processing cores to a network protocol engine.

19. The method of clause 17 or clause 18, further comprising:
offloading compression or decompression processing from the one or more second processing cores to a compression logic circuit or a decompression logic circuit in the storage engine.

20. The method of any one of clauses 17-19, further comprising:
after performing the one or more storage tasks, handing over one or more media management tasks to a media management module of the integrated circuit via the one or more job queues; and
performing the one or more media management tasks by one or more third processing cores in the media management module.

21. The method of clause 20, wherein the performing the one or more media management tasks comprises:
offloading an erasure coding, a hash calculation or comparison, an error correction coding, or any combination thereof to one or more first logic circuits in the media management module; and
performing flash translation layer process or error handling partially on the one or more third processing cores and partially on one or more second logic circuits in the media management module.

22. The method of any one of clauses 17-21, further comprising:
communicating with one or more NAND devices directly via a NAND interface by a local storage driver to store data into the one or more NAND devices based on the one or more storage tasks performed by the storage engine.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A storage node, comprising:
a network interface configured to receive input data;
one or more storage components; and
an integrated circuit communicatively coupled to the network interface and the one or more storage components and configured to perform a plurality of tasks that correspond to the received input data, the plurality of tasks placed into a job queue, wherein the job queue is configured to include one or more network tasks, one or more storage tasks, and one or more media management tasks, the integrated circuit comprising:
a network engine comprising one or more first processing cores, the one or more first processing cores configured to perform one or more network tasks of the plurality of tasks in the job queue, the network engine configured to remove the network tasks from the job queue and transfer the job queue to a storage engine;
the storage engine comprising one or more second processing cores, the one or more second processing cores configured to perform one or more storage tasks of the plurality of tasks in the job queue for storing data to the one or more storage components, wherein the storage engine is configured to remove the storage tasks from the job queue and transfer the job queue to a media management module; and
the media management module comprising one or more third processing cores configured to perform one or more media management tasks of the plurality of tasks in the job queue, wherein the media management module is configured to perform any one or more of: an erasure coding, a hash calculation or comparison, an error correction coding, a flash translation layer process, or an error handling process.

2. The storage node of claim 1, wherein the network engine further comprises a network offload engine configured to offload network protocol processing from the one or more first processing cores to the network offload engine, wherein the network offload engine is configured to perform network protocol conversions or encryption tasks.

3. The storage node of claim 1, wherein the storage engine further comprises a compression logic circuit or a decompression logic circuit configured to offload compression or decompression processing from the one or more second processing cores to the compression logic circuit or the decompression logic circuit.

4. The storage node of claim 1, wherein the media management module further comprises one or more logic circuits configured to offload the erasure coding, the hash calculation or comparison, the error correction coding, or any combination thereof from the one or more third processing cores to the one or more logic circuits.

5. The storage node of claim 1, wherein the media management module further comprises one or more logic circuits configured to perform the flash translation layer process or the error handling process partially on the one or more third processing cores and partially on the one or more logic circuits.

6. The storage node of claim 1, wherein the one or more storage components comprise one or more NAND devices, and the integrated circuit comprises a local storage driver configured to communicate directly with the one or more NAND devices via a NAND interface.

7. The storage node of claim 1, wherein the network engine further comprises a second network interface configured to receive the input data from the network interface.

8. An integrated circuit, comprising:
a network engine comprising one or more first processing cores, the one or more first processing cores configured to perform one or more network tasks of a plurality of tasks in a job queue, wherein the job queue is configured to include one or more network tasks, one or more storage tasks, and one or more media management tasks, the network engine configured to remove the network tasks from the job queue and transfer the job queue to a storage engine;
the storage engine comprising one or more second processing cores, the one or more second processing cores configured to perform one or more storage tasks of the plurality of tasks in the job queue for storing data to one or more storage components, wherein the storage engine is configured to remove the storage tasks from the job queue and transfer the job queue to a media management module; and
the media management module comprising one or more third processing cores configured to perform one or more media management tasks of the plurality of tasks in the job queue, wherein the media management module is configured to perform any one or more of: an erasure coding, a hash calculation or comparison, an error correction coding, a flash translation layer process, or an error handling process.

9. The integrated circuit of claim 8, wherein the network engine comprises a network offload engine configured to offload network protocol processing from the one or more first processing cores, wherein the network offload engine is configured to perform network protocol conversions or encryption tasks.

10. The integrated circuit of claim 8, wherein the storage engine comprises a compression logic circuit or a decompression logic circuit configured to offload compression or decompression processing from the one or more second processing cores to the compression logic circuit or the decompression logic circuit.

11. The integrated circuit of claim 8, wherein the media management module further comprises one or more logic circuits configured to offload the erasure coding, the hash calculation or comparison, the error correction coding, or any combination thereof from the one or more third processing cores to the one or more logic circuits.

12. The integrated circuit of claim 8, wherein the media management module further comprises one or more logic circuits configured to perform the flash translation layer process or the error handling process partially on the one or more third processing cores and partially on the one or more logic circuits.

13. The integrated circuit of claim 8, further comprising:
a local storage driver configured to communicate directly with one or more NAND devices via a NAND interface.

14. The integrated circuit of claim 8, wherein the network engine further comprises a network interface configured to receive input data for the one or more first processing cores to perform the one or more network tasks.

15. A method for storage node management, comprising:
placing, by an integrated circuit, a plurality of tasks that correspond to received input data into a job queue, wherein the job queue is configured to include one or more network tasks, one or more storage tasks, and one or more media management tasks;
performing one or more network tasks of the plurality of tasks in the job queue by one or more first processing cores in a network engine of the integrated circuit;
after performing the one or more network tasks, removing the network tasks from the job queue by the network engine and transferring the job queue to a storage engine of the integrated circuit;
performing one or more storage tasks of the plurality of tasks in the job queue by one or more second processing cores in the storage engine;
after performing the one or more storage tasks, removing the storage tasks from the job queue by the storage engine and transferring the job queue to a media management module of the integrated circuit, wherein the job queue includes media management tasks that include any one or more of: an erasure coding, a hash calculation or comparison, an error correction coding, a flash translation layer process, or an error handling process; and
performing one or more media management tasks in the job queue by one or more third processing cores in the media management module.

16. The method of claim 15, further comprising:
offloading network protocol processing from the one or more first processing cores to a network offload engine, wherein the network offload engine is configured to perform network protocol conversions or encryption tasks.

17. The method of claim 15, further comprising:
offloading compression or decompression processing from the one or more second processing cores to a compression logic circuit or a decompression logic circuit in the storage engine.

18. The storage node of claim 1, wherein the network engine transfers the job queue including the one or more storage tasks and the one or more media management tasks to the storage engine.

19. The storage node of claim 1, wherein the storage engine transfers the job queue including the one or more media management tasks to the media management module.

* * * * *